(No Model.)

A. T. IRWIN.
BELT PULLEY.

No. 296,173. Patented Apr. 1, 1884.

Witnesses:
C. M. Clarke
R. H. Whittlesey

Inventor: Alexander T. Irwin
By Attorney George H. Christy

UNITED STATES PATENT OFFICE.

ALEXANDER T. IRWIN, OF PITTSBURG, PENNSYLVANIA, ASSIGNOR TO JONES & LAUGHLINS, (LIMITED,) OF SAME PLACE.

BELT-PULLEY.

SPECIFICATION forming part of Letters Patent No. 296,173, dated April 1, 1884.

Application filed February 25, 1884. (No model.)

*To all whom it may concern:*

Be it known that I, ALEXANDER T. IRWIN, a subject of the Queen of Great Britain, residing at Pittsburg, county of Allegheny, State of Pennsylvania, have invented or discovered a new and useful Improvement in Belt-Pulleys; and I do hereby declare the following to be a full, clear, concise, and exact description thereof, reference being had to the accompanying drawings, making a part of this specification, in which—like letters indicating like parts—

Figure 1:
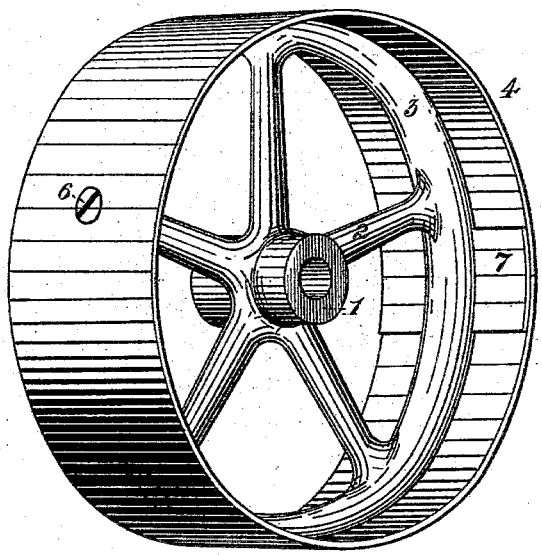
Figure 2:
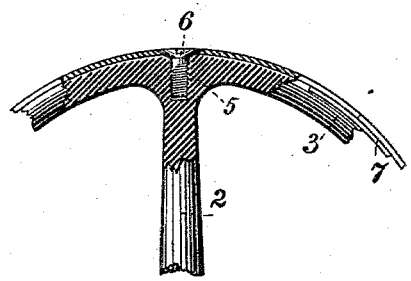

Figure 1 is a perspective view of a belt-pulley embodying my invention. Fig. 2 is a detail view, showing a section of the wheel, the rim being broken away to show the manner of securing the rim in place.

The cast-iron pulleys are objectionable on account of the liability of the thin parts of the wheel being broken, and while pulleys made wholly of wrought-iron overcome this objection, the expense and trouble of making such wheels prevent their general adoption.

The object of my invention is to combine the advantageous features of both forms; and to this end my invention consists in the construction and combination of parts, all as more fully hereinafter described and claimed.

The hub 1, spokes 2, and fellies or rim 3 are made of cast-iron, the ends of the spokes where they unite with the fellies or rim being enlarged so as to brace and strengthen those parts at that point. The periphery of the fellies or rim after being removed from the mold in which it was cast are ground and turned up, or, if a metallic chill-mold has been used, the grinding may be dispensed with. Onto this wheel is placed the rim 4, after being heated to a proper temperature so as to expand it to the proper size, it having been made slightly smaller than the cast-iron wheel. The rim 4 is formed from a broad strip of plate metal, the ends of said strip being secured together by the narrow metal strip 7, which extends across the joint of the two ends, and is welded or hard-soldered to said ends; or the ends of the strip may be welded to each other. This rim 4, in cooling, will contract tightly around the cast-iron wheel, and will be held thereon under ordinary circumstances by this contraction sufficiently tight to render needless any additional securing device; but to entirely obviate all liability of the rim slipping around or off of the wheel, I tap holes 5 through the rim and fellies, and into the enlargement in the ends of the spokes, and insert the screws 6 into said holes, thus firmly securing the parts together. As the rim 4 is quite broad, and extends on each side some distance beyond the cast-iron wheel, it protects this inner wheel from accidental blows.

If desired, the fellies 3 may be omitted, and the wrought-iron rim secured to the ends of the spokes 2 in the manner above described; but I prefer to form the cast-iron wheel as shown, for the fellies serve to strengthen and brace the spokes at their ends, and prevent them from being broken by the springing of the wrought-iron rim, as it is liable to do unless braced between the spokes by the fellies, and also prevents the rim from flattening between the spokes.

I claim herein as my invention—

1. In a belt-pulley, the hub 1, spokes 2, having enlarged ends, and the fellies 3, said parts being cast in one piece, in combination with the wrought-iron rim 4, suitably secured to the spokes and fellies, substantially as set forth.

2. In a belt-pulley, the hub 1, spokes 2, having enlarged ends, and the fellies 3, in combination with the wrought-iron rim 4, secured to the said spokes and fellies by screws, substantially as set forth.

In testimony whereof I have hereunto set my hand.

ALEXANDER T. IRWIN.

Witnesses:
 DARWIN S. WOLCOTT,
 R. H. WHITTLESEY.